US009566703B2

(12) United States Patent
Norton et al.

(10) Patent No.: US 9,566,703 B2
(45) Date of Patent: Feb. 14, 2017

(54) HAND TOOL WITH HANDLE APPARATUS AND ASSOCIATED METHOD

(75) Inventors: Jeffrey Mark Norton, Lebanon, PA (US); Robert J. Stein, Mechanicsburg, PA (US); David A. Randolph, State College, PA (US)

(73) Assignee: The Ames Companies, Inc., Camp Hill, PA (US)

( * ) Notice: Subject to any disclaimer, the term of this patent is extended or adjusted under 35 U.S.C. 154(b) by 1307 days.

(21) Appl. No.: 13/370,839

(22) Filed: Feb. 10, 2012

(65) Prior Publication Data

US 2013/0205956 A1 Aug. 15, 2013

(51) Int. Cl.

| | |
|---|---|
| ***B25G 3/12*** | (2006.01) |
| ***B23P 11/02*** | (2006.01) |
| ***B25G 1/10*** | (2006.01) |
| ***B25G 3/34*** | (2006.01) |

(52) U.S. Cl.

CPC . *B25G 1/10* (2013.01); *B25G 3/34* (2013.01); *Y10T 29/49945* (2015.01)

(58) Field of Classification Search

CPC ............... B25G 1/10; B25G 3/34; B25G 3/36; B23P 11/02; Y10T 29/49945

USPC ......... 81/489, 177.1, 177.2; 16/110.1, 112.1, 16/422, 426, 430; 403/361, 345; 294/49, 57

See application file for complete search history.

(56) References Cited

U.S. PATENT DOCUMENTS 1,211,175 A * 1/1917 Kinzel ..................... B25G 3/02 279/97
2,921,326 A * 1/1960 Lautmann ............ A46B 5/0095 15/145
4,451,073 A * 5/1984 Carmien .................. A01B 1/22 16/110.1
5,120,098 A * 6/1992 Childress ............... A01B 1/028 254/131.5
5,299,475 A * 4/1994 Stroop ..................... B25G 1/00 16/421
5,533,768 A * 7/1996 Mitchell .................. B25G 1/01 294/54.5
5,699,700 A * 12/1997 Carmien .................. A01B 1/02 29/525.12
5,921,700 A * 7/1999 Haver .................... A01B 1/227 16/108
6,213,672 B1 * 4/2001 Varga ...................... A47L 13/20 15/144.4
7,581,771 B2 * 9/2009 Rosine ..................... A01B 1/02 294/54.5

* cited by examiner

*Primary Examiner* — Hadi Shakeri

(74) *Attorney, Agent, or Firm* — Kristin L. Murphy; Brooks Kushman P.C.

(57) ABSTRACT

An improved hand tool includes an improved handle apparatus. The handle apparatus includes an elongated handle having a non-circular external cross-section and further includes an elongated support that comprises an elongated end extending from the handle and having a substantially circular cross-sectional shape. A tool apparatus includes a tool and a socket, with the socket having an opening formed therein. The end of the handle apparatus is received with an interference fit in the opening formed in the socket to retain the handle apparatus and the tool apparatus together. A collar can additionally be provided about the socket to improve the aesthetic properties of the connection between the socket and handle and to increase the toughness of the connection therebetween.

14 Claims, 7 Drawing Sheets

HAND TOOL WITH HANDLE APPARATUS AND ASSOCIATED METHOD

BACKGROUND

Field

The disclosed and claimed concept relates generally to hand tools and, more particularly, to an improved method of mounting a handle having a non-circular exterior surface to a tool, and an associated method.

Related Art

Numerous hand tools such as shovels, rakes, trowels, and the like are well known in the relevant art. The handles of such hand tools have historically been of a substantially round, i.e., substantially circular, cross-section, but more recently a number of non-circular handles have been introduced that are ergonomically superior for use in the hand.

It has also been known to connect such handles, both those having a round cross-section and those having a non-round cross-section, to a tool with the use of a mechanical fastener. For example, an elongated rivet or bolt extends across the diameter of the handle and also extends through the sides of a socket within with the end of the handle is disposed, whereby the mechanical fastener helps to retain the handle in the socket. It can be understood, however, that such mechanical fasteners undesirably add to the cost and weight of a tool. While methodologies have been developed for mounting a handle having a round cross-section to a tool without the use of such an additional mechanical fastener, it has not yet been possible to apply such methodologies to a handle having a non-round cross-sectional external shape.

SUMMARY

An improved hand tool includes an improved handle apparatus. The handle apparatus includes an elongated handle having a non-circular external cross-section and further includes an elongated support that comprises an elongated end extending from the handle and having a substantially circular cross-sectional shape. A tool apparatus includes a tool and a socket, with the socket having an opening formed therein. The end of the handle apparatus is received with an interference fit in the opening formed in the socket to retain the handle apparatus and the tool apparatus together. A collar can additionally be provided about the socket to improve the aesthetic properties of the connection between the socket and handle and to increase the toughness of the connection therebetween.

Accordingly, an aspect of the disclosed and claimed concept is to provide an improved method of manufacturing a hand tool.

Another aspect of the disclosed and claimed concept is to provide an improved handle apparatus that can be employed in the aforementioned method.

Another aspect of the disclosed and claimed concept is to provide an improved hand tool that results from the aforementioned handle apparatus being subjected to the improved method and attached to a tool apparatus.

These and other aspects of the disclosed and claimed concept are provided by an improved method of manufacturing a hand tool that is of a type that includes a tool apparatus having a socket and a tool connected together, with the socket having an opening formed therein. The method can be generally stated as including providing a handle apparatus that includes an elongated handle having an external cross-sectional shape that is non-circular in a direction transverse to the direction of elongation and that further includes an elongated end having an external cross-sectional shape that is substantially circular in a direction transverse to the direction of elongation, and receiving at least a portion of the end in the opening with an interference fit between at least a portion of the end and at least a portion of the socket Other aspects of the disclosed and claimed concept are provided by an improved handle apparatus structured for incorporation into a hand tool that can be generally stated as including a tool apparatus having a socket and a tool connected together, with the socket having an opening formed therein. The handle apparatus can be generally stated as including an elongated handle having an external cross-sectional shape that is non-circular in a direction transverse to the direction of elongation, and an elongated support can be generally stated as including an elongated end that extends from the handle and that has an external cross-sectional shape that is substantially circular in a direction transverse to the direction of elongation, at least a portion of the end being structured to be received in the opening and to have an interference fit with at least a portion of the socket.

BRIEF DESCRIPTION OF THE DRAWINGS

A further understanding of the disclosed and claimed concept can be gained from the following Description when read in conjunction with the accompanying drawings in which:

Similar numerals refer to similar parts throughout the specification.

DESCRIPTION

Figure 1:
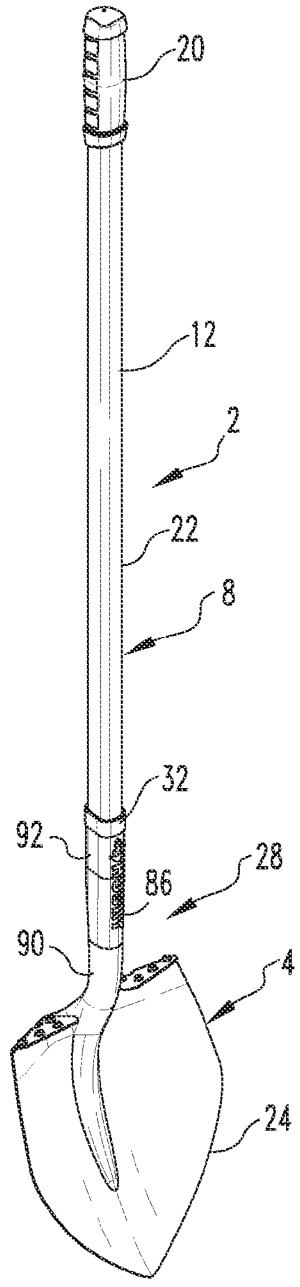
FIG. 1 is a perspective view of an improved hand tool in accordance with the disclosed and claimed concept.
Figure 2:
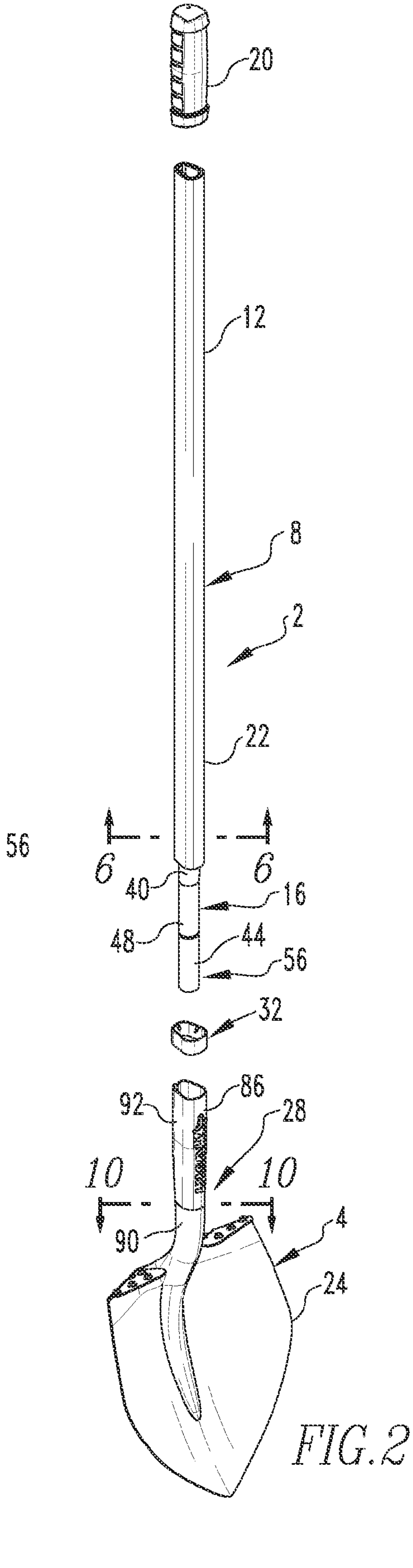
FIG. 2 is an exploded view of the hand tool of FIG. 1 and depicts an improved handle apparatus in accordance with the disclosed and claimed concept.

An improved hand tool 2 in accordance with the disclosed and claimed concept is depicted generally in FIG. 1 and is depicted in an exploded fashion in FIG. 2. The hand tool 2 can be said to include a tool apparatus 4 and a handle apparatus 8 which are connected together when the hand tool 2 is fully assembled, as in FIG. 1. As will be set forth in greater detail below, the handle apparatus 8 includes a handle having a non-circular cross-sectional shape while still being connected with the tool apparatus 4 without the need to provide an additional mechanical fastener such as a bolt or rivet that would extend across the diameter of the handle apparatus 8 and that would be connected with a tool apparatus 4, thus reducing the cost and weight of the hand tool 2.

Figure 3:
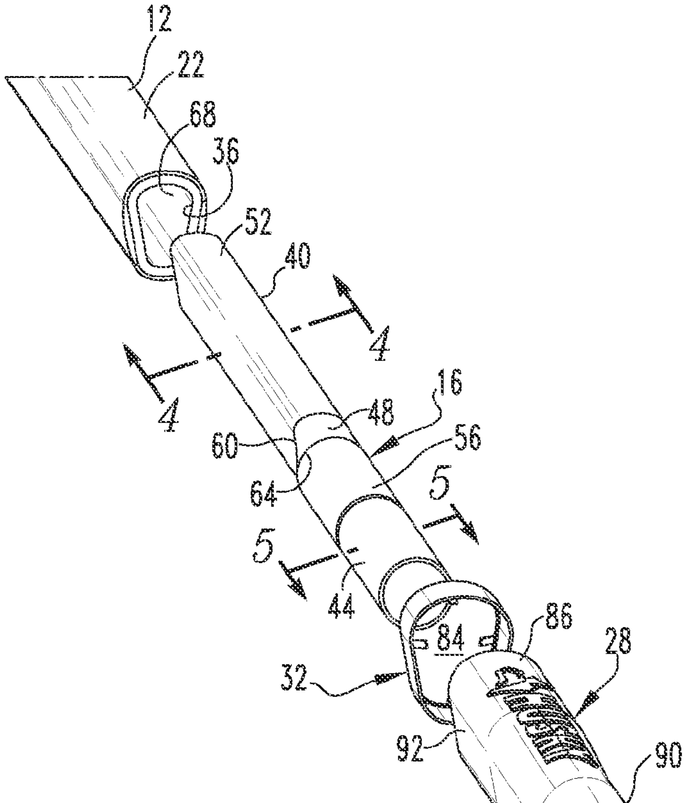
FIG. 3 is an exploded view of a portion of the handle apparatus of FIG. 2.
Figure 3:
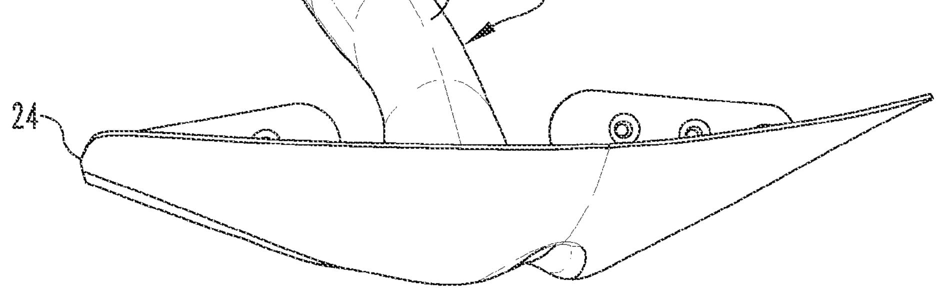

As can be understood from FIGS. 2 and 3, the handle apparatus 8 includes an elongated handle 12, an elongated support 16, and a grip 20. As can be understood from FIG. 2, a portion of the support 16 is receivable in the handle 12. The grip 20 is mountable on the handle 12 at the end opposite the support 16.

Figure 5:
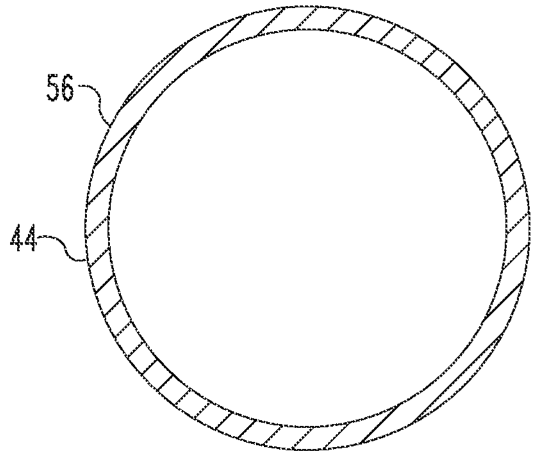
FIG. 5 is a sectional view as taken along line 5-5 of FIG. 3.

The handle 12 can be seen from FIGS. 3 and 5 to have an external surface 22 that is of a non-circular cross-sectional shape. That is, the external shape of the handle 12 in a direction transverse to its longitudinal extent is non-circular. In particular, the external surface 22 is more of a rounded trapezoidal shape that may include one or more regions of reduced durometer hardnesses for gripping purposes.

As can be understood from FIGS. 1 and 2, the tool apparatus 4 can be said to include a tool 24 and a socket 28 that are connected together. The tool apparatus 4 further includes a collar 32 that is mountable on the socket 28. The tool 24 is depicted herein as being in the exemplary form of the head of a shovel, although it is understood that numerous other types of tools such as rakes, spades, trowels, post hole diggers, and the like can be employed without departing from the present concept.

Figure 4:
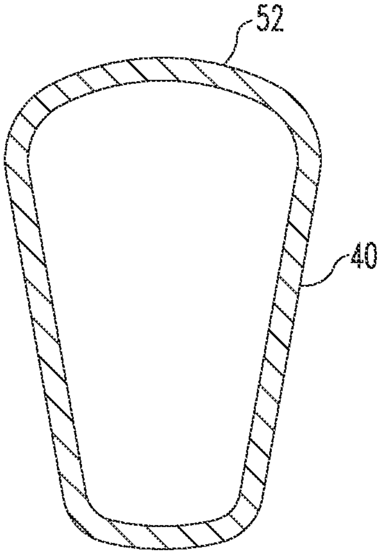
FIG. 4 is a sectional view as taken along line 4-4 of FIG. 3.

Further regarding FIG. 3, it can be said that the handle 12 has an aperture 36 formed therein that runs substantially the longitudinal extent of the handle 12. The support 16 can be said to include an elongated first portion 40, at least a portion of which is received in the aperture 36 in order to form the handle apparatus 8. The support 16 further includes an elongated second portion 44 that is receivable in the socket 16, and further includes a transition portion 48 that extends between the first and second portions 40 and 44. As can be understood from FIGS. 3 and 4, the first portion 40 can be said to have an external surface 52 that is of a non-circular shape in a direction transverse to the longitudinal extent of the first portion 40. That is, the external surface 52 in cross-section is of a non-circular shape. In contrast, and as can be seen in FIGS. 3 and 5, the second portion 44 has an external surface 56 that is substantially circular in cross-section, meaning that its shape in a direction transverse to its longitudinal extent is substantially circular. The transition portion 48 has a cross-sectional shape that varies between non-circular at a first location 60 adjacent the first portion 40 and a substantially circular shape at a second location adjacent the second portion 44.

Figure 6:
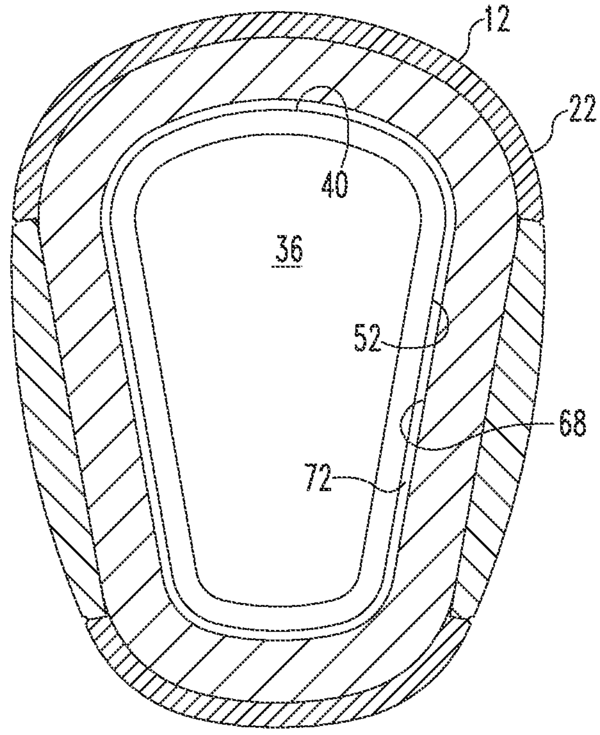
FIG. 6 is a sectional view as taken along line 6-6 of FIG. 2.

As can be understood from FIGS. 3 and 6, the aperture 36 has an internal surface 68 that is of a non-circular cross-sectional shape. The external surface 52 of the first portion 40 of the support 16 is configured to correspond with and to have a shape that is complementary to the internal surface 68. In order to assemble together the handle 12 and the support 16 to form the handle apparatus 8, the first portion 40 is received in the aperture 36 and is affixed therein. In the exemplary embodiment depicted herein, the handle 12 and the first portion 40 are affixed together with an adhesive 72 that is received between the external surface 52 and the internal surface 68. Alternatively, the handle 12 and the first portion 40 could be co-formed. Any of a variety of appropriate adhesives can be employed depending upon the materials from which the handle 12 and the support 16 are formed. In the exemplary embodiment depicted herein, the adhesive 72 is an epoxy-based material, but any appropriate material can be used to adhere or otherwise the handle 12 and the support 16 together.

Figure 7:
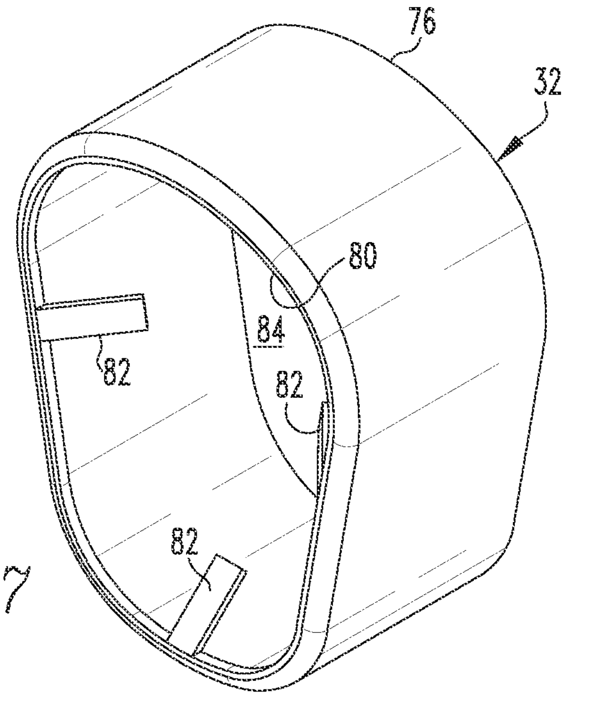
FIG. 7 is a perspective view of a collar of the hand tool.
Figure 8:
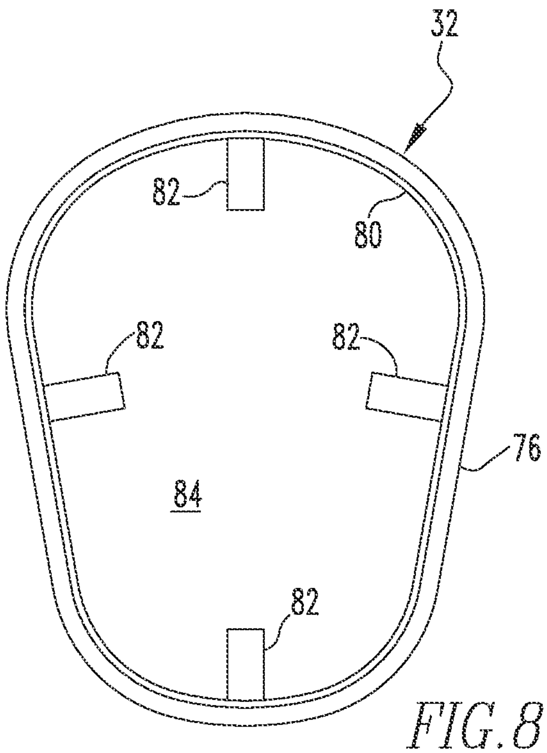
FIG. 8 is a front elevational view of the collar of FIG. 7.

The collar 32 is depicted in greater detail in FIGS. 7 and 8. The collar 32 can be seen as including a retention ring 76 about which extends a lip 80. The collar 32 further includes a number of tabs 82 that extend from the lip 80 and which, in at least the unassembled state of the collar 32, protrude into a hole 84 formed in the collar 32. As employed herein, the expression "a number of" and variations thereof shall refer broadly to any non-zero quantity, including a quantity of one. As can be understood from FIGS. 7 and 8, the collar 32 and, more particularly, the retention ring 76 and the lip 80, are of a non-circular shape in a direction transverse to the longitudinal extent of the handle 12 as assembled in FIG. 1. In this regard, a portion of the handle apparatus 8 and, more particularly, the second portion 44 and the transition portion 48 of the support 16 and a portion of the handle 12, are received in the hole 84 when mounting the handle apparatus 8 to the tool apparatus 4.

Figure 9:
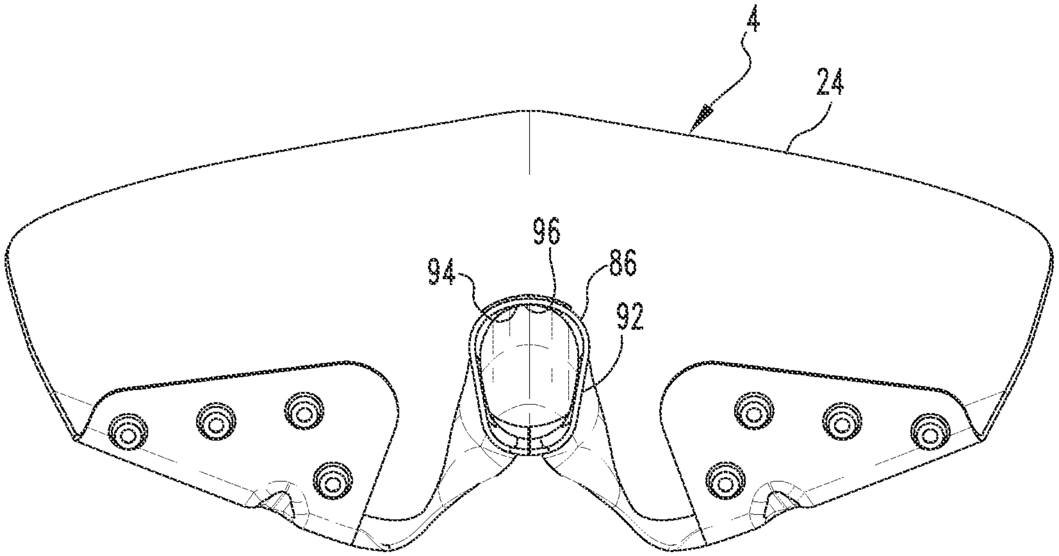
FIG. 9 is an end view of a tool apparatus of the hand tool of FIG. 1.
Figure 10:
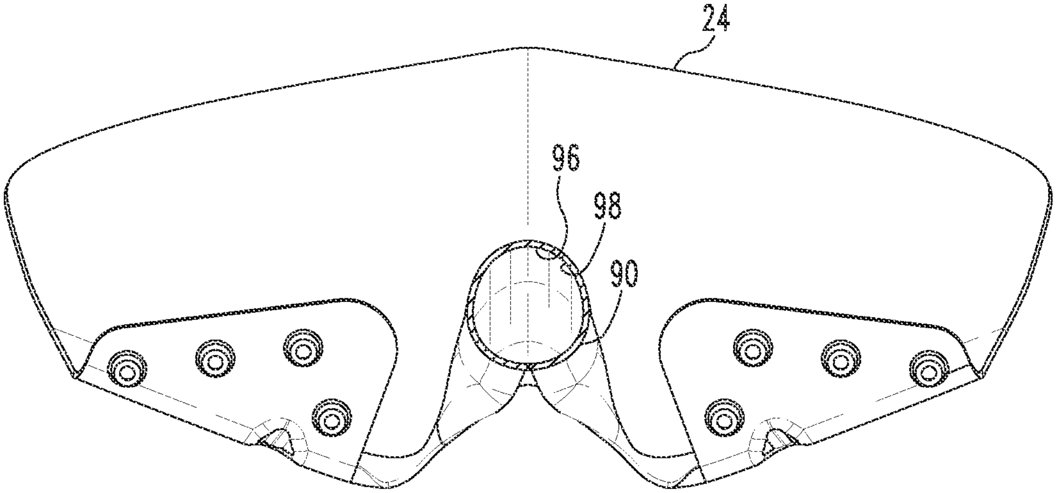
FIG. 10 is a sectional view as taken along line 10-10 of FIG. 2.

As can be understood from FIGS. 2, 9, and 10, the socket 28 can be said to include an elongated first region 86 that is of a non-circular cross-section and an elongated second region 90 that can be said to be of a substantially circular cross-section. In particular, and as is best shown in FIG. 9, the first region 86 has an external surface 92 and an internal surface 94, both of which are of a non-circular cross-sectional shape in a direction transverse to the longitudinal extent of the first region 86. The internal surface 94 surrounds a portion of an opening 96 formed in the socket 28 and which receives at least a portion of the handle apparatus 8 therein. As can be seen in FIG. 10, the second region 90 has an internal surface 98 that is of a substantially circular cross-sectional shape and which additionally surrounds another portion of the opening 96.

In order to assemble the tool apparatus 4 and the handle apparatus 8 together, the collar 32 is received on the first region 86 of the socket 28 with the tabs 82 received at least partially in the opening 96. In this regard, the retention ring 76 can be said to surround a portion of the external surface 92 of the first region 86.

Figure 11:
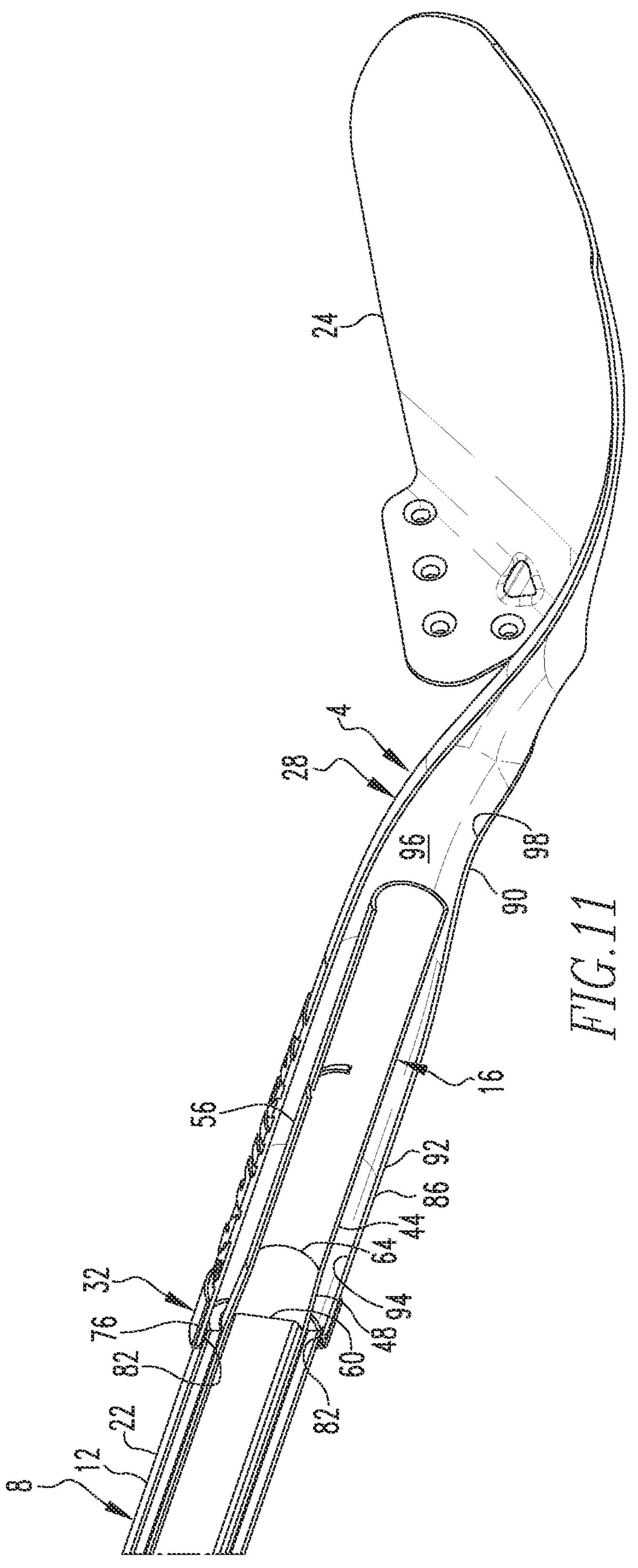
FIG. 11 is a view of the handle apparatus of FIG. 2 and the tool apparatus of FIG. 9, partially cut away, depicting the process of assembling together the handle apparatus and the tool apparatus.
Figure 12:
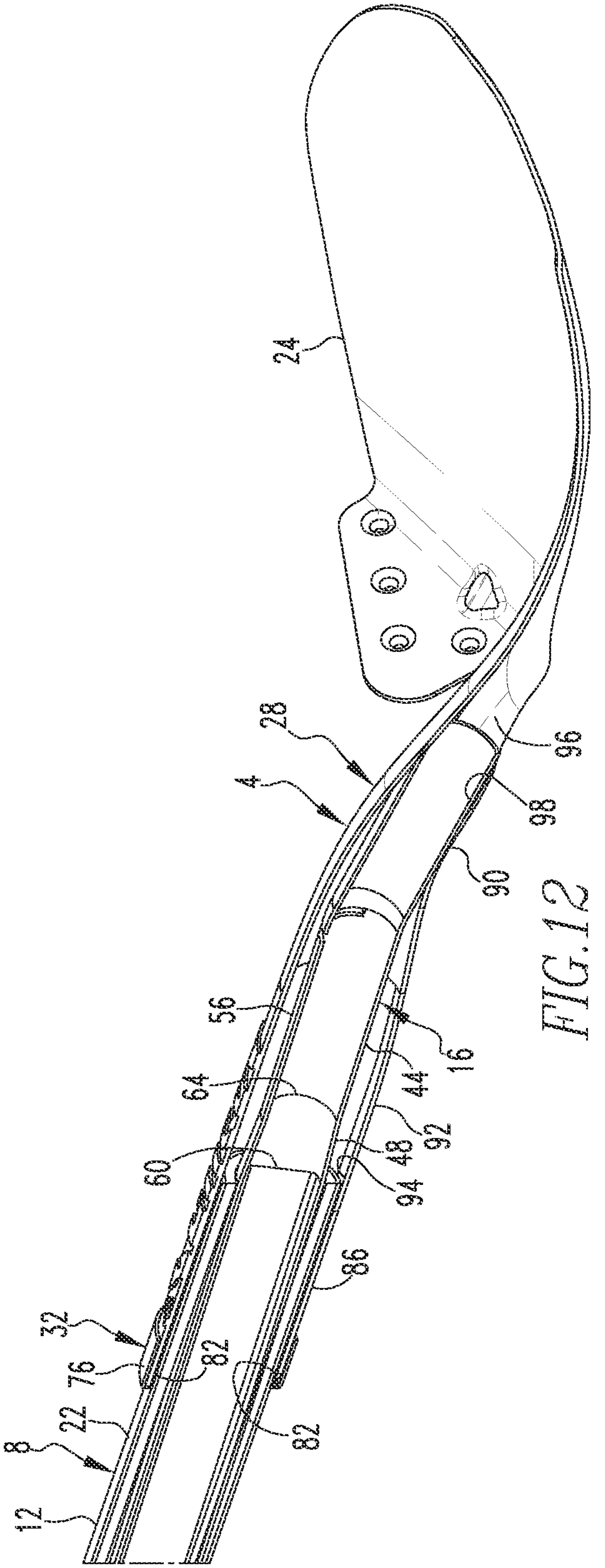
FIG. 12 is a view similar to FIG. 11, except depicting the handle apparatus and the tool apparatus assembled together.

As can be seen in FIG. 11, the handle apparatus 8 and the tool apparatus 4 are assembled together by receiving the second portion 44 of the support 16 through the hole 84 and directing the second portion 44 along the longitudinal extent of the opening 96 within the socket 28. In so doing, at least a portion of the handle 12 is received in the opening 96 of the socket 28 in at least the first region 86, which causes the tabs 82 to become compressed between the external surface 22 of the handle 12 and the internal surface 94 of the first region 86 of the socket 28. The tabs 82 become engaged with the external surface 22 of the handle 12, and a portion of the collar 32, namely the tabs 82, can be said to extend generally between the handle 12 and the socket 28. Such insertion of the handle apparatus 8 into the socket 28 as is depicted generally in FIG. 11 typically requires at least a nominal level of compressive force applied between the handle apparatus 8 and the tool apparatus 4.

In order to fully assemble together the tool apparatus 4 and the handle apparatus 8, further compressive force is required to be applied between them in order to cause the second portion 44 of the support 16 to be received in the second region 90 of the socket 28 with an interference fit therebetween. That is, the handle apparatus 8 is advanced into the opening 96 to cause an interference fit therebetween.

More particularly, the handle apparatus 8 is advanced into the opening 96 to cause an interference fit between at least a portion of the second portion 44 and at least a portion of the socket 28. In such a condition, the external surface 56 of the second portion 44 is compressively engaged with the internal surface 98 of the second region 90, which retains the tool apparatus 4 and the handle apparatus 8 connected together.

The collar 32 situated about the first region 86 increases the aesthetic appearance of the hand tool 2. Moreover, the retention ring 76 that extends about the first region 86 increases the toughness of the hand tool 2 and, more particularly, the toughness of the connection between the tool apparatus 4 and the handle apparatus 8, by resisting the bending forces that are applied to the handle 12 during use from causing portions of the first region 86 to separate from one another.

Figure 13:
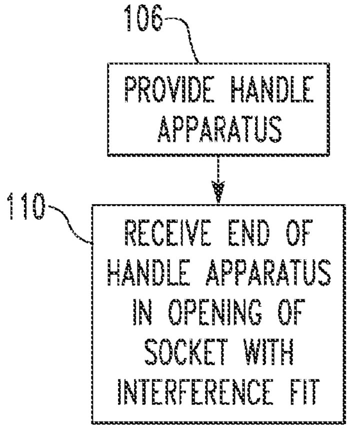
FIG. 13 is a flowchart depicting certain aspects of an improved method in accordance with the disclosed and claimed concept.

As can be seen in FIG. 13, a method of assembling the tool 2 can be said to include providing the handle apparatus 8, as at 106, which includes the elongated handle 12 having an external cross-sectional shape that is non-circular in a direction transverse to the direction of elongation of the handle 12. The handle apparatus 8 further includes the elongated second portion 44 which serves as an end of the handle apparatus 8 and which has an external cross-sectional shape that is substantially circular in a direction transverse to its direction of elongation. The method further includes receiving, as at 110, at least a portion of the end of the handle apparatus 8 in the opening 98 of the socket 28 with an interference fit between at least a portion of the end and at least a portion of the socket 28.

By providing the support 16 that includes both a first portion 40 of a non-circular external surface 52 and a second portion 44 having a substantially circular external surface 56, the handle 12 and the support 12 can be assembled together to form the improved handle apparatus 8. The improved handle apparatus 8 can then be received in the socket 28 with an interference fit between the substantially circular internal surface 98 and the substantially circular external surface 56. It is noted, however, that the handle 12 can advantageously have the external surface 22 that is of a non-circular cross-section still being affixed to the handle apparatus 8 without the need for an additional fastener such as a bolt or rivet that extends between the handle 12 and the tool apparatus 4. Variations will be apparent to one of ordinary skill in the art.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A hand tool comprising a handle apparatus and a tool apparatus, the handle apparatus comprising:

an elongated handle having an external cross-sectional shape that is non-circular in a direction transverse to a direction of elongation and having formed therein an aperture that extends substantially the longitudinal extent of the handle;

a support comprising an elongated first portion and an elongated second portion, at least a part of the first portion having a complementary cross-sectional shape to the aperture, in the direction transverse to the direction of elongation, the at least a part of the first portion being received in at least a portion of the aperture, at least a part of the second portion having an external cross-sectional shape that is substantially circular in a direction transverse to the direction of elongation; and wherein the tool apparatus includes a socket and a tool connected together, the socket having an opening formed therein, wherein the at least part of the second portion is structured to be received in the opening such that at least a portion of the socket has an interference fit with the at least a part of the second portion to secure the handle apparatus to the tool apparatus without use of a mechanical fastener extending across the diameter of the handle apparatus.

2. The handle apparatus of claim 1 wherein the support further comprises a transition portion situated between the first and second portions and which has an external cross-sectional shape that varies between non-circular at a location disposed adjacent the first portion and substantially circular at a location disposed adjacent the second portion.

3. The handle apparatus of claim 1 wherein the handle and the first portion of the support are adhered together.

4. The hand tool of claim 1 wherein the socket includes a region having an internal cross-sectional shape that is substantially circular and that has the interference fit with the at least part of the second portion, and wherein the socket includes an elongated other region having an internal cross-sectional shape that is non-circular in a direction transverse to the direction of elongation.

5. The hand tool of claim 4 wherein a portion of the handle is received in the other region of the socket.

6. The hand tool of claim 5 wherein the tool apparatus further has a collar having a hole formed therein, at least a portion of the collar being situated on an external surface of the other region of the socket, at least a portion of the handle being received in the hole.

7. The hand tool of claim 6 wherein at least a portion of the collar is received between the handle and the socket.

8. The hand tool of claim 7 wherein the collar has a number of tabs that extend into the hole, the handle and at least a portion of the number of tabs being engaged together.

9. The handle apparatus of claim 1 wherein the handle has an external cross-sectional shape that is substantially unvarying throughout its longitudinal extent.

10. A method of manufacturing a hand tool that comprises a tool apparatus having a socket and a tool connected together, the socket having an opening formed therein, the method comprising:

providing a tool apparatus having a socket and tool connected together, the socket having an opening formed therein;

providing a handle apparatus that includes an elongated handle and a support, the handle having an external cross-sectional shape that is non-circular in a direction transverse to the direction of elongation and having formed therein an aperture that has a non-circular cross-sectional shape, the aperture extending substantially the longitudinal extent of the handle, the support having an elongated first portion and an elongated second portion, at least a part of the first portion having an external cross-sectional shape that is complementary to a cross-sectional shape of the aperture and second portion having an external cross-sectional shape that is substantially circular in a direction transverse to the direction of elongation;

at least partially receiving the first portion in at least a portion of the aperture; and receiving at least a part of the second portion in the opening with an interference fit between the second portion and the socket to join the handle apparatus to the tool apparatus without requiring the use of a mechanical fastener.

11. The method of claim 10, further comprising adhering together the handle and the first portion of the support.

12. The method of claim 10, further comprising:

receiving at least a part of the second portion through a hole formed in a collar of the tool apparatus; and receiving at least a portion of the collar between the handle and the socket.

13. The method of claim 12 wherein the collar has a number of tabs that extend into the hole, and further comprising engaging together the handle and at least a portion of the number of tabs.

14. The method of claim 10, further comprising providing as the handle an elongated handle whose external cross-sectional shape is substantially unvarying throughout its longitudinal extent.

* * * * *